(12) United States Patent
Pesonen et al.

(10) Patent No.: US 9,639,159 B2
(45) Date of Patent: May 2, 2017

(54) PHYSICAL SURFACE INTERACTION

(71) Applicant: Rovio Entertainment Ltd, Espoo (FI)

(72) Inventors: Mika Pesonen, Espoo (FI); Johannes Rajala, Espoo (FI)

(73) Assignee: ROVIO ENTERTAINMENT LTD, Espoo (FI)

( * ) Notice: Subject to any disclaimer, the term of this patent is extended or adjusted under 35 U.S.C. 154(b) by 119 days.

(21) Appl. No.: 14/340,601

(22) Filed: Jul. 25, 2014

(65) Prior Publication Data

US 2016/0026263 A1  Jan. 28, 2016

(51) Int. Cl.
G06F 3/01 (2006.01)
G06F 3/038 (2013.01)
G06F 3/0354 (2013.01)

(52) U.S. Cl.
CPC ............. G06F 3/016 (2013.01); G06F 3/038 (2013.01); G06F 3/0354 (2013.01)

(58) Field of Classification Search
CPC ...... G06F 3/0317; G06F 3/0321; G06F 3/033; G06F 3/03545; G06F 3/03547; G06F 3/0414; G06F 3/044
USPC ................ 345/173–179; 178/18.01–18.09, 178/20.01–20.04
See application file for complete search history.

(56) References Cited

U.S. PATENT DOCUMENTS

| 5,714,972 | A  | * | 2/1998 | Tanaka et al. ............... 345/156 |
| 8,090,722 | B2 | * | 1/2012 | Krishnaprasad .. G06F 17/30011 707/741 |
| 2002/0079143 | A1 | * | 6/2002 | Silverstein et al. ........ 178/18.01 |
| 2002/0158921 | A1 | * | 10/2002 | Silverstein ...................... 345/864 |
| 2003/0133629 | A1 | * | 7/2003 | Sayers ........................... 382/313 |
| 2008/0235210 | A1 | * | 9/2008 | Krishnaprasad .. G06F 17/30011 |
| 2008/0244385 | A1 | * | 10/2008 | Zukowski ............. G06F 17/241 715/255 |
| 2009/0158181 | A1 | * | 6/2009 | Becerra, Sr. ...... G06F 17/30716 715/764 |
| 2009/0271691 | A1 | * | 10/2009 | Brush ............... G06F 17/30011 715/201 |
| 2010/0306004 | A1 | * | 12/2010 | Burtner ................. G06Q 10/10 705/301 |
| 2011/0028219 | A1 |   | 2/2011 | Heatherly et al. |
| 2012/0084467 | A1 |   | 4/2012 | Birnbaum et al. |
| 2013/0196766 | A1 | * | 8/2013 | Leyland et al. ................ 463/36 |
| 2014/0179444 | A1 |   | 6/2014 | Vignocchi et al. |

FOREIGN PATENT DOCUMENTS

WO   96/03188 A1   2/1996

* cited by examiner

*Primary Examiner* — Vijay Shankar
(74) *Attorney, Agent, or Firm* — Squire Patton Boggs (US) LLP

(57) ABSTRACT

In accordance with an example aspect of the present invention, there is provided an apparatus comprising at least one receiver configured to receive an identifier of an accessory and sensor information, at least one processing core configured to obtain, based at least in part on the sensor information, a location of the apparatus on a physical surface and a second location in a virtual space, the first location corresponding to the second location via a mapping, and to cause transmission of the identifier of the accessory and information identifying the second location.

20 Claims, 5 Drawing Sheets

PHYSICAL SURFACE INTERACTION

FIELD OF INVENTION

The present invention relates to interaction with data using a physical surface.

BACKGROUND OF INVENTION

Maps record geographical or urban features of a landscape, and can be conveniently printed on paper which may be folded to a compact size for easy portability and reference. In other words, features in maps correspond to features in terrain via a mapping. Such a mapping may comprise a scale. By consulting a map a person is enabled to discover aspects of her surroundings that may not be obvious by surveying the surroundings visually. Examples of such aspects may include elevation, nearby buildings, nearby streets, public transport connections and municipal or international borders.

A map may record geographical features of terrain, for example for an entire country, or a map may comprise urban features of a city or part thereof. Some maps, such as digital maps, comprise both geographical and urban features, wherein urban features become prominent when the digital map is zoomed to a scale where the urban features are significant.

Industrial plants may be mapped to a functional map, such that the functional map comprises features that are relevant to an industrial process run in the plant. In detail, the functional map may have represented therein process phases in such a way that a skilled person consulting the functional map can learn features of the process. A functional map may have active components, such as warning lights, arranged to provide dynamic information of current process parameters, such as temperature and/or pressure, for example.

Interacting with data may be accomplished via an operating system, such as the Linux operating system, wherein a user may input, using a keyboard, textual commands into a command window displayed on a screen device. Responsive to the textual commands, the operating system may perform operations on data, which may be stored on data files. For example, data files may be copied, moved, archived or compressed in dependence of the textual commands input by the user.

Some operating systems, such as Windows, feature a virtual desktop with icons representing programs, files and folders. Using a pointing device, such as for example a computer mouse, a user may activate, delete or move the icons to cause the operating system to take actions the user wishes.

SUMMARY OF THE INVENTION

In accordance with a first aspect of the present invention, there is provided an apparatus comprising at least one receiver configured to receive an identifier of an accessory and sensor information, at least one processing core configured to obtain, based at least in part on the sensor information, a location of the apparatus on a physical surface and a second location in a virtual space, the first location corresponding to the second location via a mapping, and to cause transmission of the identifier of the accessory and information identifying the second location.

Various embodiments of the first aspect comprise at least one feature from the following bulleted list:

the at least one receiver is further configured to receive an action indicator from a physical button, and the at least one processing core is configured to cause transmission of information indicating the physical button has been activated the physical button is comprised in the apparatus the apparatus is further configured to receive the accessory in a physical receptacle comprised in the apparatus the at least one receiver is further configured to receive second sensor information and the at least one processing core is configured to obtain, based at least in part on the second sensor information, a third location and a fourth location, the third location being a location of the apparatus on the physical surface and the fourth location being a location in the virtual space, the third and fourth locations corresponding to each other via the mapping the at least one processing core is configured to cause transmission of the information identifying the second location as information associated with the accessory the at least one receiver is further configured to receive virtual space information, and the at least one processing core is configured to, responsive to the virtual space information, trigger a haptic feedback actuator to produce haptic feedback the at least one receiver is further configured to receive dynamic sensor information, the at least one processing core is further configured to obtain, based on the dynamic sensor information, movement information describing movement of the apparatus on the physical surface, and based on the movement information to trigger production of haptic feedback the at least one processing core is further configured to trigger the production of the haptic feedback based at least in part based on where on the physical surface the apparatus is determined, by the at least one processing core, to be moving the at least one processing core is configured to cause periodic transmission of location updates concerning virtual space locations corresponding to locations on the physical surface where the apparatus determines itself to be the at least one receiver is configured to receive the sensor information from a sensor comprised in the apparatus the at least one processing core is configured to associate the location of the apparatus on the physical surface with an element in the virtual space, and to associate an orientation of the apparatus on the physical surface with an action to be performed with respect to the element in the virtual space In accordance with a second aspect of the present invention, there is provided a method comprising receiving, in an apparatus, an identifier of an accessory and sensor information, obtaining, based at least in part on the sensor information, a location of the apparatus on a physical surface and a second location in a virtual space, the first location corresponding to the second location via a mapping, and causing transmission of the identifier of the accessory and information identifying the second location.

Various embodiments of the second aspect comprise at least one feature corresponding to a feature from the preceding bulleted list laid out above in connection with the first aspect.

In accordance with a third aspect of the present invention, there is provided an apparatus comprising means for receiving, in an apparatus, an identifier of an accessory and sensor information, means for obtaining, based at least in part on the sensor information, a location of the apparatus on a physical surface and a second location in a virtual space, the first location corresponding to the second location via a mapping, and means for causing transmission of the identifier of the accessory and information identifying the second location.

In accordance with a fourth aspect of the present invention, there is provided a non-transitory computer readable medium having stored thereon a set of computer readable instructions that, when executed by at least one processor, cause an apparatus to at least receive, in an apparatus, an identifier of an accessory and sensor information, obtain, based at least in part on the sensor information, a location of the apparatus on a physical surface and a second location in a virtual space, the first location corresponding to the second location via a mapping, and cause transmission of the identifier of the accessory and information identifying the second location.

Industrial Applicability

At least some embodiments of the present invention find application in industrial process control.

DETAILED DESCRIPTION OF EXAMPLE EMBODIMENTS

By interacting with a physical object on a physical surface, a user can cause changes in data in a virtual space which corresponds to the physical surface and to receive feedback from the virtual space via the physical object.

Figure 1:
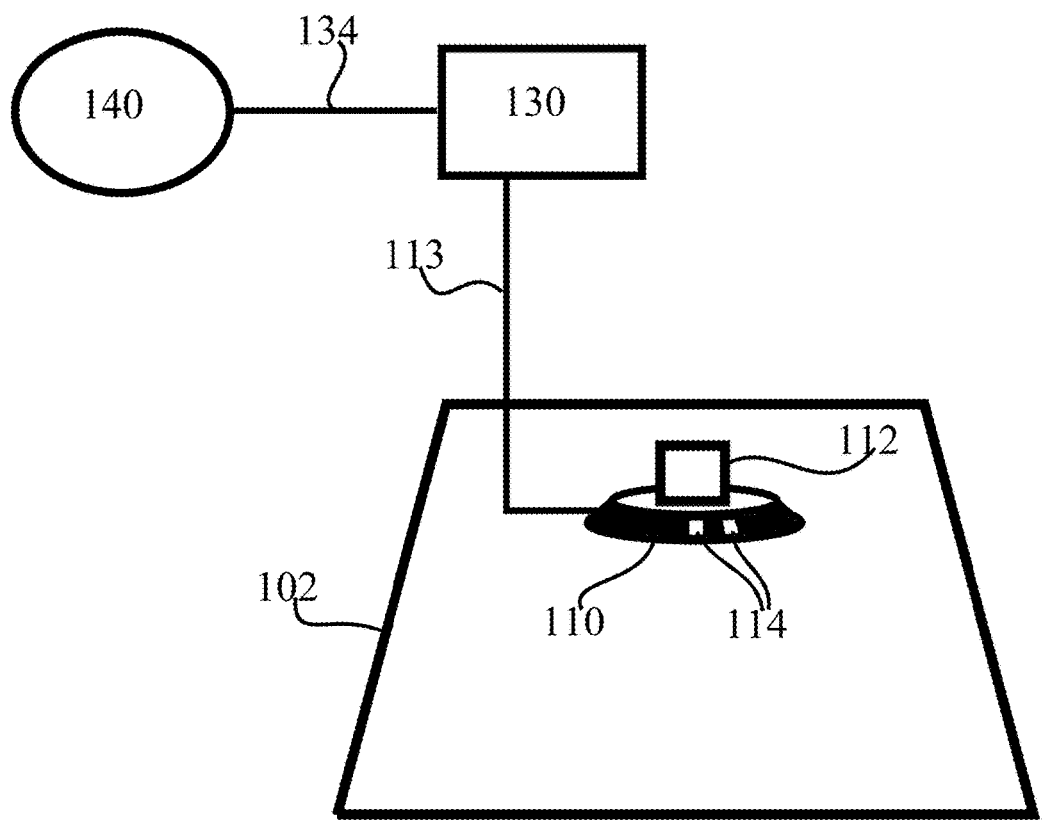
FIG. 1 illustrates an example system capable of supporting at least some embodiments of the present invention.

FIG. 1 illustrates an example system capable of supporting at least some embodiments of the present invention. Physical surface 102 may comprise, for example, a printed map or other suitable surface capable of supporting thereon device 110. Device 110 comprises a physical object capable of lying on physical surface 102, pressed against it by gravity such that physical surface 102 in turn rests on a suitable further surface or object. In case physical surface 102 is at an angle, friction between physical surface 102 and device 110 may keep device 110 stationary with respect to physical surface.

Device 110 is in communication with computer 130 via connection 113. Connection 113 may be a wire-line connection, such as an Ethernet connection, or it may be at least in part a wireless connection, such as a Wi-Fi or Bluetooth connection, for example. Computer 130 in turn may be connected, via connection 134, to network 140. In some embodiments, network 140 is absent. Computer 130, or a device accessible via network 140, may comprise a server function that maintains a virtual space.

Device 110 may be configured to determine where on physical surface 102 it is located. To such end, device 110 may comprise, on a side facing physical surface 102, a sensor such as, for example, a camera arranged to image the underlying physical surface 102. Physical surface 102 may comprise printed thereon a predetermined dot, micro-dot, barcode or other suitable pattern the camera is able to detect, and device 110 may be furnished with a mapping from the pattern to a location on physical surface 102. In addition to location, an orientation of device 110 on physical surface 102 may be determinable based on sensing the pattern.

Alternatively to a camera, device 110 may employ a different kind of sensor unit to obtain sensor information enabling the determination of the location and/or orientation of device 110 on physical surface 102. For example, device 110 may comprise a near-field communication, NFC, sensor configured to detect NFC tags implanted in physical surface 102. Camera data and NFC sensing data are examples of sensor information. Sensor information may be processed to compress it, or to improve its usability for determining the location and/or orientation of device 110 on physical surface 102. Processed sensor information may also be referred to as sensor information in that it is information originating in at least one sensor, processed or otherwise.

While in the foregoing it is described that device 110 is configured to determine its location and/or orientation on physical surface 102, in some embodiments device 110 is configured to provide to computer 130 sensor information obtained by device 110 of physical surface 102, to enable computer 130 to determine the location and/or orientation of device 110 on physical surface 102. Computer 130 may provide this location and/or orientation to device 110 if this is necessary, wherein receipt of the location and/or orientation in device 110 amounts to obtaining the location and/or orientation in device 110.

Device 110 may be powered via connection 113, for example via an electrical lead comprised in an electrical cable in embodiments where connection 113 is wire-line. Alternatively or additionally, device 110 may comprise a disposable or rechargeable battery.

Device 110 may be associated with accessory 112. Accessory 112 may comprise, for example, a handle, a smart card encoded with a user-specific code or a toy. Accessory 112 may rest on top of device 110, for example in a slot or recess arranged in device 110 to receive it, wherein such a recess or slot may be of similar shape to a part of accessory 112 that is to be inserted into the recess or slot. Such a recess or slot may comprise an electrical connector to form a direct link between device 110 and accessory 112. Alternatively, accessory may communicate with device 110 via a wireless or cable link. A wireless or cable link may be useful in case accessory is not in physical contact with device 110. Accessory 112 may be configured to provide an identifier of itself to device 110. Accessory 112 may provide the identifier via a link. The identifier of accessory 112 may be specific to the accessory unit 112, or specific to a type of accessory that accessory 112 represents. For example, the identifier may indicate the accessory is a certain type of handle, the identifier may indicate an IP address of accessory 112 or the identifier may comprise an identity of a user associated with accessory 112. An IP address may comprise an IPv4 or IPv6 address. Using an IPv6 address may enable identification of accessory 112 from among a large group of accessories, wherein the IPv6 address may be configured into accessory 112 in connection with manufacture of accessory 112.

Accessory 112 may be powered by a battery comprised in accessory 112, and/or accessory 112 may be powered via device 110 via an electrical connector between device 110 and accessory 112. In some embodiments, accessory 112 is powered wirelessly, for example when accessory 112 rests on device 110 it may be powered by device 110 in accordance with the Qi wireless charging standard.

Device 110 may be configured to, being in possession of the location and/or orientation of device 110 on physical surface 102, derive a location and/or orientation in virtual space that corresponds to the location and/or orientation of device 110 on physical surface 102. The correspondence of the location on physical surface 102 on the one hand, and the location in the virtual space on the other hand, may be via a suitable mapping. Physical surface 102 may correspond, via the mapping, to all or part of the virtual space. The mapping may comprise use of a scale, such that, for example, a distance of 1 centimeter on physical surface 102 may correspond to a distance of one meter, one kilometer or one nautical mile, in the virtual space. In general a virtual space may comprise a digital representation of a metric space that is capable of containing therein virtual space elements. Virtual space elements may comprise digital representations comprising at least one characteristic. Virtual space elements may be disposed at specific locations in a virtual space. Some virtual space elements are able to move in the virtual space.

Device 110 may be configured to provide, for example to computer 130, the location and/or orientation in the virtual space that corresponds to the location and/or orientation of device 110 on physical surface 102. Device 110 may be configured to provide, for example to computer 130, the identifier of the accessory. In some embodiments, device 110 provides to computer 130 the location in virtual space as a location of accessory 112. Device 110 may provide the location and the identifier of accessory 112 via connection 113, for example.

After providing the location and/or orientation in the virtual space to computer 130, device 110 may obtain a second location and/or orientation of itself on physical surface 102. A user may have moved device 110 on physical surface 102, for example. Responsive to a determination, by device 110, that it has moved on physical surface 102, device 110 may provide an updated location and/or orientation in virtual space to computer 130, wherein the updated location and/or orientation in virtual space corresponds, via the mapping, to the new position and/or orientation of device 110 in physical surface 102.

Device 110 may comprise at least one physical button 114. Device 110 may be configured to inform computer 130 responsive to activation of physical button 114. In case device 110 comprises more than one physical button 114, device 110 may be configured to inform computer 130 which one of the physical buttons 114 was activated. Activation of a physical button may comprise that a user presses the physical button. Physical button 114 may be labelled so that the user knows what effect pressing the button will have. Alternatively to an identity of a physical button, device 110 may be configured to inform computer 130 concerning a function associated with an activated button.

In some embodiments, device 110 has indicated on its outside a direction, wherein such indication of direction may comprise, for example, an image or an arrow printed or painted on device 110. A user may interact with the virtual space by placing device 110 on a selected location on physical surface 102, by rotating device 110 so as to align the indication of direction on device 110 with a function indicated on an edge of physical surface 102, and activating a physical button on device 110. Device 110 may determine, based on obtained sensor information, its location and orientation on physical surface 102, determine based on the location on physical surface 102 a corresponding location in the virtual space, and responsive to the activation of a physical button indicate, to computer 130, an action determined by the orientation of device 110 on physical surface 102 to be performed in the determined location in the virtual space. In these embodiments, therefore, in general, a location of device 110 on physical surface 102 is associated with an object or location in the virtual space, and the orientation of device 110 on physical surface 102 is associated with an action to be performed in the location, or on the object, in the virtual space. Activation of a physical button may trigger the performing of the action. An element in virtual space may comprise either a location or an object in the virtual space. Examples of actions performed on the object may comprise, for example, but not limited to, modifying the object, deleting the object, encrypting the object, decrypting the object or modifying access rights to the object.

For example, where physical surface 102 comprises a layout of a factory, the user may place device 110 on a section of physical surface 102 that corresponds to a boiler. The user may then rotate device 110 so that the indication of direction on device 110 points to the left-hand-side edge of physical surface 102, and press a physical button on device 110. In this example the left-hand-side of physical surface is labelled "start" and the right-hand-side is labelled "stop", so the user's action will cause a "start" instruction to be sent to a unit in the virtual space that corresponds to the boiler. Consequently, the virtual space may instruct an actual boiler in the factory to start. Effectively, the orientation of device 110 may thus correspond to a selection in a context menu.

As another example, where the virtual space corresponds to a game, the user may place device 110 on a section of physical surface 102 that corresponds to a car. The user may then rotate device 110 so that the indication of direction on device 110 points to the left-hand-side edge of physical surface 102, and press a physical button on device 110. In this example the left-hand-side of physical surface is labelled "select", whereby the user selects this particular car for use in a racing duel. As a yet further example, the virtual space may correspond to a chess game, wherein the user may place device 110 on a section of physical surface 102 that corresponds to a square, such as e4, on the chess board, and rotate device 110 to signal to the chess game he wants to move the piece on square e4.

Device 110 may comprise at least one haptic feedback actuator. A haptic feedback actuator is enabled to cause device 110 to provide to a user feedback that can be sensed by touch. For example, a haptic feedback actuator may comprise a vibrating element arranged to cause device 110 to vibrate. Alternatively, or additionally, a haptic feedback actuator may provide an electric shock to the user, squirt water at the user, or mechanically prod the user's hand.

Computer 130 may have comprised therein, or connected thereto via a suitable connection, a screen device. Computer 130 may be configured to cause the screen device to display an image that portrays a view into the virtual space. The view may comprise static and dynamic content, wherein static content may comprise virtual-space features that do not change in time, and dynamic content may comprise elements of the virtual space that can be interacted with. For example, static content may comprise a virtual-space representation of a feature imprinted permanently on physical surface 102, such as a lake. That static content does not change in time does not exclude the possibility the static content is animated in the view, not changing in time means in this context that the content does not move from one place in the virtual space to another place. For example, a lake may be static content with gentle wave animation, however the lake does not move or vanish from its location in the virtual space.

For example, a dynamic element may comprise a representation of device 110 and/or an accessory associated with device 110. Where in the view a representation of device 110 is placed may depend on where on physical surface 102 device 110 is located. An orientation of the representation in the view may depend on an orientation of device 110 on physical surface 102. The screen device may alternatively be comprised in or connected to another unit than computer 130.

Figure 2A:
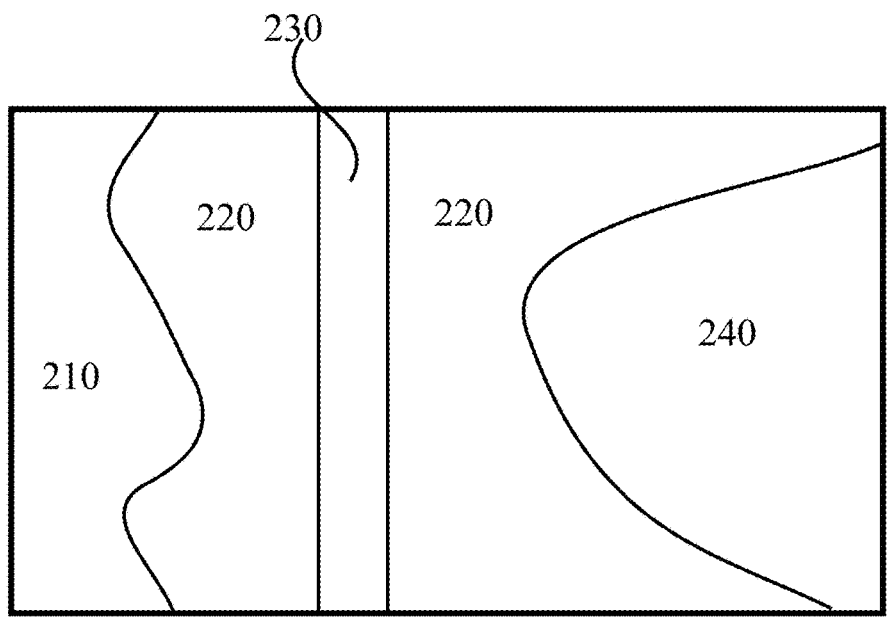
FIG. 2A illustrates an example pattern for a physical surface.

FIG. 2A illustrates an example pattern for a physical surface. The pattern may be printed on physical surface 102 of FIG. 1, for example. In the example pattern, reference 210 corresponds to a mountain, reference 220 corresponds to grassland, reference 230 corresponds to a road, and finally, reference 240 corresponds to a lake.

Figure 2B:
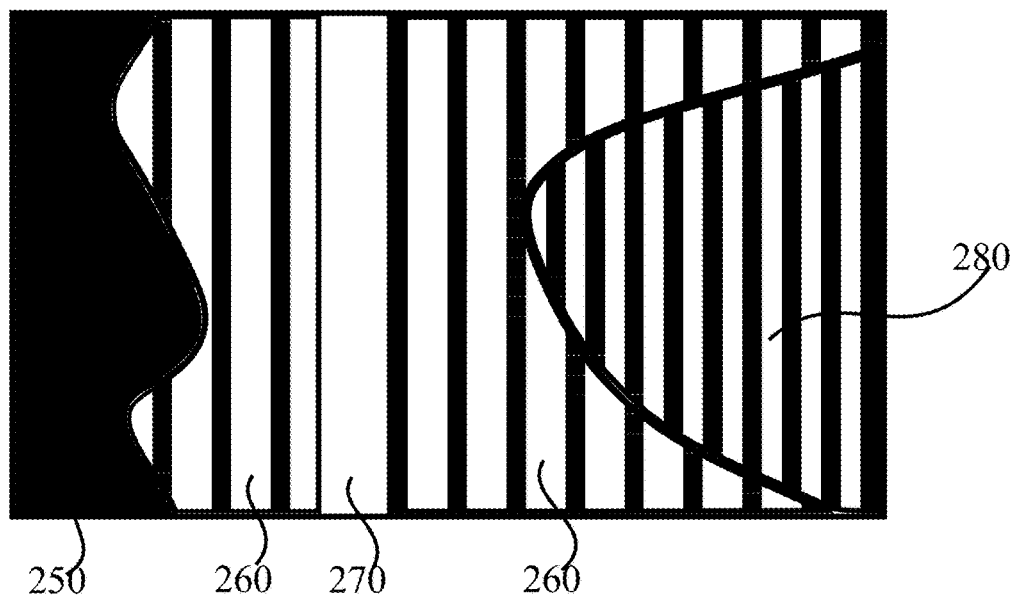
FIG. 2B illustrates a haptic map in accordance with some embodiments of the invention.

FIG. 2B illustrates a haptic map in accordance with some embodiments of the invention. The haptic map is associated with the pattern of FIG. 2A. In detail, area 250 corresponds to mountain 210 of FIG. 2A, area 260 corresponds to grassland 220 of FIG. 2A, area 270 corresponds to road 230 of FIG. 2A, and finally, area 280 corresponds to lake 240 of FIG. 2A.

In some, but not all, embodiments of the invention, as device 110 is moved along physical surface 102, device 110 provides haptic feedback which corresponds to a type of terrain in virtual space that corresponds to the part of physical surface 102 where device 110 is moving. In detail, device 110 may obtain dynamic sensor information and determine based at least in part on the dynamic sensor information where on physical surface 102 device 110 is moving. For example, an amplitude and/or frequency of vibration may be selected by device 110 in dependence of the terrain type. In some embodiments, a resolution of the haptic map is lower than a resolution at which the pattern of FIG. 2A is produced on the physical surface.

Figure 3:
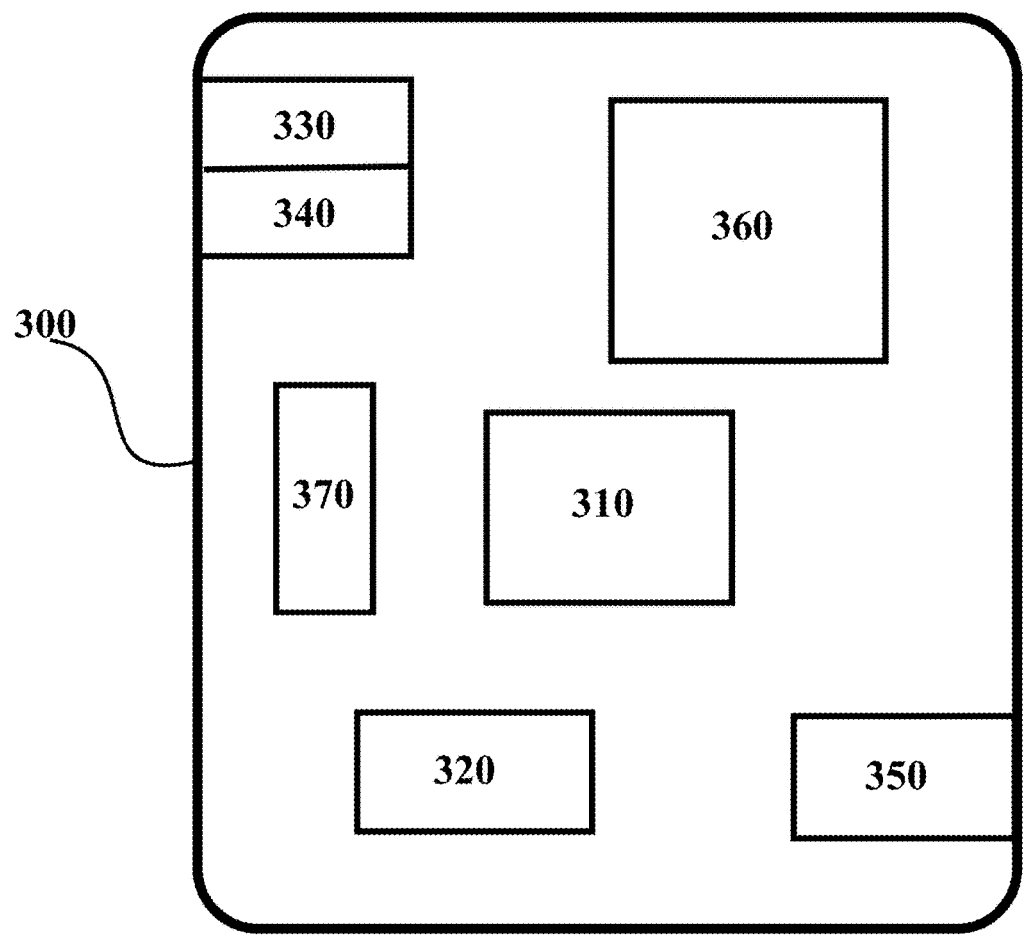
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, device 110 of FIG. 1. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by Intel Corporation or a Brisbane processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in device 300. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, at least one physical button, a touchscreen, a vibrator arranged to signal to a user by causing device 300 to vibrate, a speaker and a microphone. A user may be able to operate device 300 via UI 360, for example to interact with a virtual space and/or to play games.

Device 300 may comprise or be arranged to accept accessory 370, which may comprise, for example, a user identity module. A user identity module may comprise, for example, a subscriber identity module, SIM, card installable in device 300. A user identity module may comprise information identifying a subscription of a user of device 300. A user identity module may comprise cryptographic information usable to verify the identity of a user of device 300 and/or to facilitate encryption of communicated information and billing of the user of device 300 for communication effected via device 300. Alternatively, accessory 370 may comprise a different kind of accessory than a user identity module.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or accessory 370.

Processor 310, memory 320, transmitter 330, receiver 340, NFC transceiver 350, UI 360 and/or accessory 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
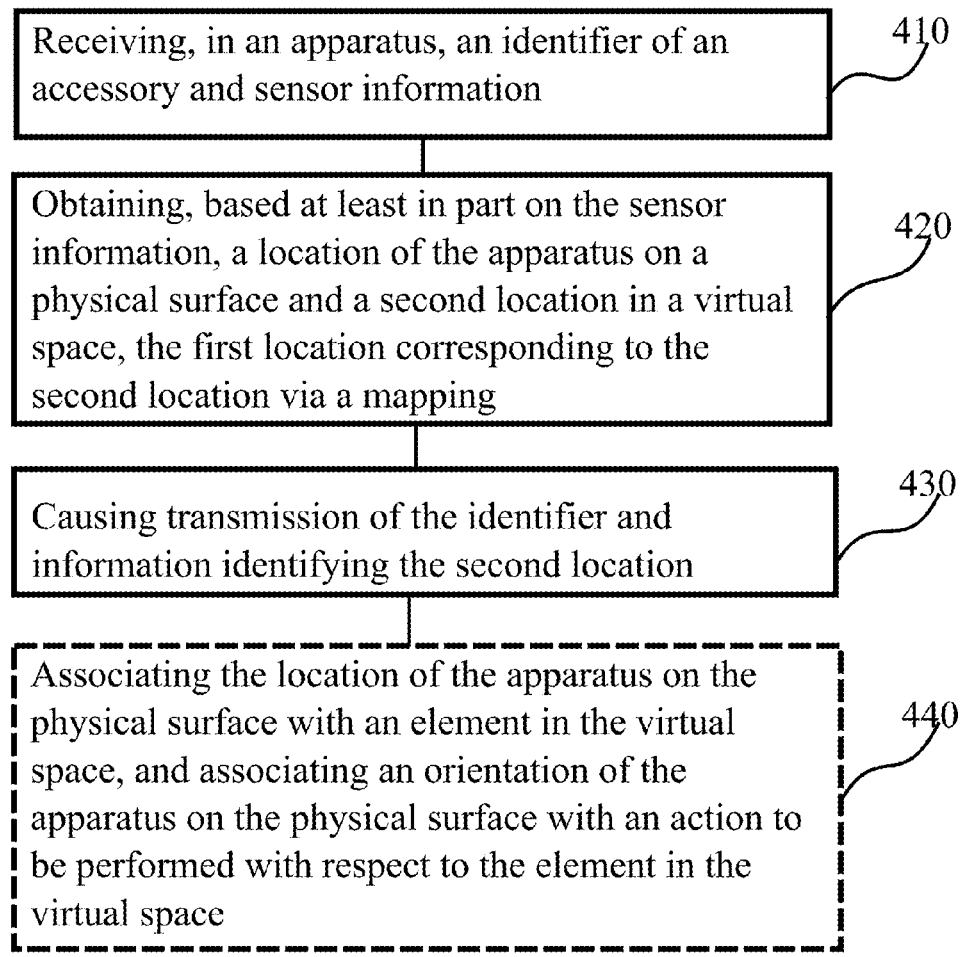
FIG. 4 is a flow chart of a method in accordance with at least some embodiments of the present invention.
Figure 5:
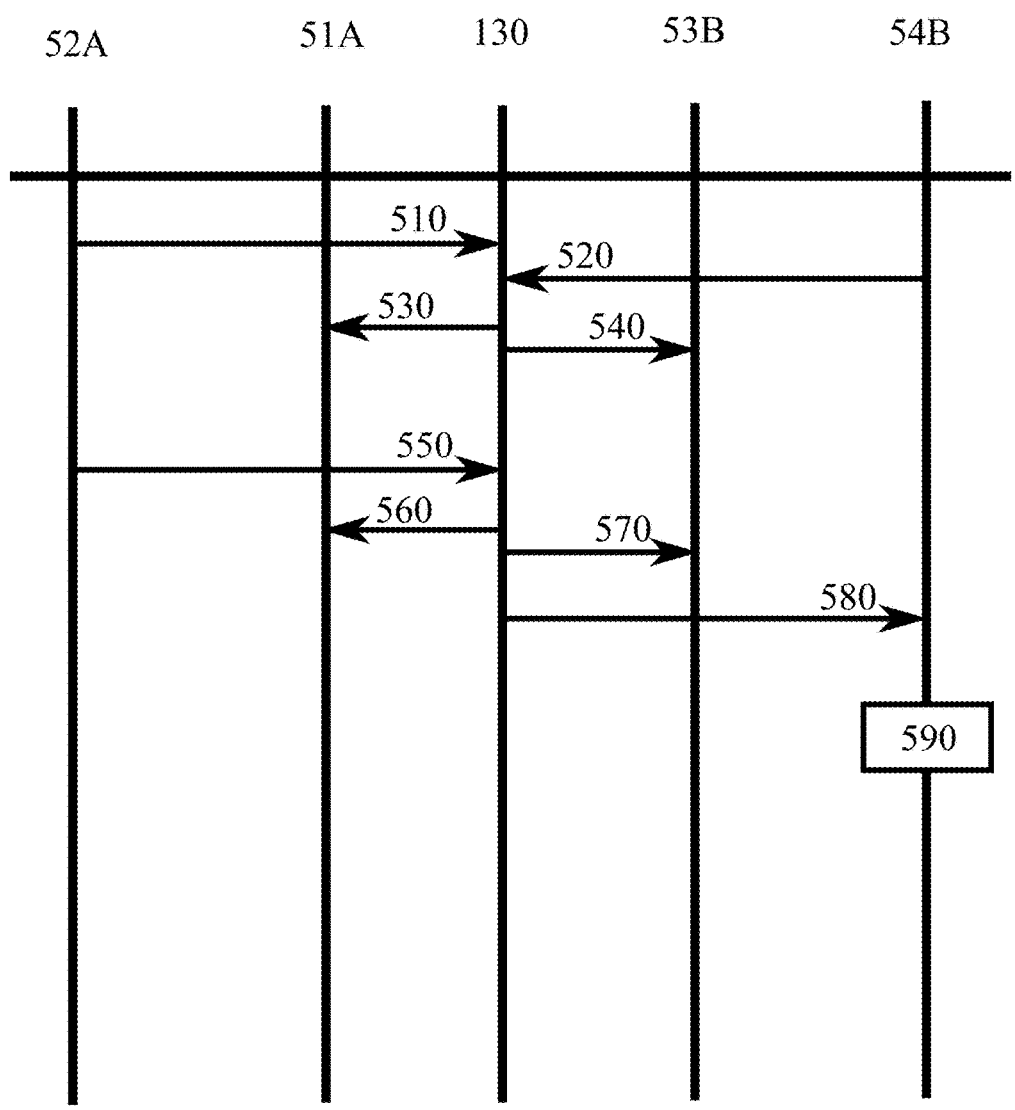
FIG. 5 is a signalling diagram in accordance with at least some embodiments of the present invention.

FIG. 4 is a flow chart of a method in accordance with at least some embodiments of the present invention. The phases of the illustrated method may be performed in device 110, or a control device implanted in device 110 to control the functioning thereof. Phase 410 comprises receiving, in an apparatus, an identifier of an accessory and sensor information. The sensor information and the identifier may be received from different sources, for example from a sensor unit and the accessory, respectively. Phase 420 comprises obtaining, based at least in part on the sensor information, a location of the apparatus on a physical surface and a second location in a virtual space, the first location corresponding to the second location via a mapping. Phase 430 comprises causing transmission of the identifier of the accessory and information identifying the second location. Optional phase 440 comprises associating the location of the apparatus on the physical surface with an element in the virtual space, and associating an orientation of the apparatus on the physical surface with an action to be performed with respect to the element in the virtual space FIG. 5 is a signalling diagram in accordance with at least some embodiments of the present invention. On the vertical axes are disposed, from left to right, first device 52A, first screen device 51A, computer 130, second screen device 53B, and, finally, second device 54B. Devices 52A and 54B may be similar devices to device 110 of FIG. 1. Computer 130 may be a similar device as computer 130 of FIG. 1. Screen device 51A is configured to provide a first user, of device 52A, a view into a section of the virtual space which corresponds to a physical surface used by the first user. Screen device 53B is configured to provide a second user, of device 54B, a view into a section of the virtual space which corresponds to a physical surface used by the second user.

In phase 510, device 52A provides to computer 130 information describing a location in virtual space, and, optionally, an orientation in virtual space. The location in virtual space is determined by device 52A based on a location of device 52A on a physical surface. The orientation may be determined by device 52A based on an orientation of device 52A on the physical surface. Phase 510 may also comprise device 52A informing computer 130 of an identifier of an accessory associated with device 52A.

Phase 520 comprises device 54B providing to computer 130 information describing a location in virtual space, and, optionally, an orientation in virtual space. The location in virtual space is determined by device 54B based on a location of device 540 on a physical surface. The orientation may be determined by device 54B based on an orientation of device 54B on the physical surface. Phase 520 may also comprise device 54B informing computer 130 of an identifier of an accessory associated with device 54B.

In phases 530 and 540, computer 130 provides to screen devices 51A and 53B, respectively, a view of the virtual space. Where devices 52A and 54B are on physical surfaces that correspond to a same section of the virtual space, the views provided to the screen devices portray the same section of the virtual space. In the provided view may be visible elements corresponding to device 52A and/or its associated accessory, and/or device 54B and/or its associated accessory. The view may also comprise as static content a background that may be a representation of features imprinted on the physical surfaces devices 52A and 54B are on. Phases 530 and 540 may be considered to be continuous phases in that computer 130 may provide a continuous feed of view to the screen devices.

In phase 550, the first user sees a representation of device 54B in the view of the virtual space displayed on screen device 51A, which serves the first user. The first user turns device 52A so that it is oriented in such a way that an indication of direction on device 52A points toward a section on the first user's physical surface that corresponds to a place in virtual space where the representation of device 54B is. As the first user turns device 52A, he may see on screen device 51A a representation of device 52A turn, until the representation of device 52A faces toward the representation of device 54B. The first user may then press a button on device 52A, which triggers a signal from device 52A to computer 130. The pressing of the button triggers a firearm in the virtual space, the firearm being held by the representation of device 52A.

In phases 560 and 570, computer 130 continues to provide the view of the virtual space, as in phases 530 and 540. In phases 560 and 570, the view may comprise bullets flying, in the virtual space, from the representation of device 52A toward the representation of device 54B. Once the bullets reach the representation of device 54B in the virtual space, computer 130 provides, in phase 580, a signal to device 54B. Responsively, device 54B may trigger a haptic feedback actuator comprised in device 54B. The haptic feedback, which may comprise vibration, occurs in phase 590 as an apparent response to the representation of device 54B being shot by the representation of device 52A.

In the embodiment described here in connection with FIG. 5, the accessory associated with device 52A may determine the appearance and capability of a firearm held by the representation of device 52A in the virtual space. In case device 52A is not associated with any accessory, the representation of device 52A may be portrayed in the view provided by computer 130 as empty-handed.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
at least one receiver configured to receive an identifier of an accessory associated with the apparatus and a first sensor information; and
at least one processing core configured to obtain, based at least in part on the first sensor information, a first location of the apparatus on a physical surface and a second location in a virtual space that comprises a location of the accessory, the first location corresponding to the second location via a mapping, and to cause transmission of the identifier of the accessory and information identifying the second location.

2. The apparatus according to claim 1, wherein the at least one receiver is further configured to receive an action indicator from a physical button, and the at least one processing core is configured to cause transmission of information indicating the physical button has been activated.

3. The apparatus according to claim 2, wherein the physical button is comprised in the apparatus.

4. The apparatus according to claim 1, wherein the apparatus is further configured to receive the accessory in a physical receptacle comprised in the apparatus.

5. The apparatus according to claim 1, wherein the at least one receiver is further configured to receive second sensor information and the at least one processing core is configured to obtain, based at least in part on the second sensor information, a third location and a fourth location, the third location being a location of the apparatus on the physical surface and the fourth location being a location in the virtual space, the third and fourth locations corresponding to each other via the mapping.

6. The apparatus according to claim 1, wherein the at least one receiver is further configured to receive virtual space information, and the at least one processing core is configured to, responsive to the virtual space information, trigger a haptic feedback actuator to produce haptic feedback.

7. The apparatus according to claim 1, wherein the at least one receiver is further configured to receive dynamic sensor information, the at least one processing core is further configured to obtain, based on the dynamic sensor information, movement information describing movement of the apparatus on the physical surface, and based on the movement information to trigger production of haptic feedback and wherein the at least one processing core is further configured to trigger the production of the haptic feedback based at least in art based on where on the physical surface the apparatus is determined, by the at least one processing core, to be moving.

8. The apparatus according to claim 1, wherein the at least one processing core is configured to cause periodic transmission of location updates concerning virtual space locations corresponding to locations on the physical surface where the apparatus determines itself to be.

9. The apparatus according to claim 1, wherein the at least one processing core is configured to associate the location of the apparatus on the physical surface with an element in the virtual space, and to associate an orientation of the apparatus on the physical surface with an action to be performed with respect to the element in the virtual space.

10. A method comprising:
receiving, in an apparatus, an identifier of an accessory associated with the apparatus and a first sensor information;
obtaining, based at least in part on the first sensor information, a first location of the apparatus on a physical surface and a second location in a virtual space that comprises a location of the accessory, the first location corresponding to the second location via a mapping, and
causing transmission of the identifier of the accessory and information identifying the second location.

11. The method according to claim 10, further comprising receiving an action indicator from a physical button, and causing transmission of information indicating the physical button has been activated.

12. The method according to claim 10, further comprising receiving the accessory in a physical receptacle comprised in the apparatus.

13. The method according to claim 10, further comprising receiving second sensor information and obtaining, based at least in part on the second sensor information, a third location and a fourth location, the third location being a location of the apparatus on the physical surface and the fourth location being a location in the virtual space, the third and fourth locations corresponding to each other via the mapping.

14. The method according to claim 10, further comprising causing transmission of the information identifying the second location as information associated with the accessory.

15. The method according to claim 10, further comprising receiving virtual space information, and responsive to the virtual space information, triggering a haptic feedback actuator to produce haptic feedback.

16. The method according to claim 10, further comprising receiving dynamic sensor information, obtaining, based on the dynamic sensor information, movement information describing movement of the apparatus on the physical surface, and based on the movement information triggering production of haptic feedback.

17. The method according to claim 16, wherein the triggering of the production of the haptic feedback is based at least in part based on where on the physical surface the apparatus is determined to be moving.

18. The method according to claim 10, wherein the sensor information is received from a sensor comprised in the apparatus.

19. The method according to claim 10, further comprising associating the location of the apparatus on the physical surface with an element in the virtual space, and associating an orientation of the apparatus on the physical surface with an action to be performed with respect to the element in the virtual space.

20. A non-transitory computer readable medium having stored thereon a set of computer readable instructions that, when executed by at least one processor, cause an apparatus to at least:
receive, in the apparatus, an identifier of an accessory associated with the apparatus and a first sensor information;
obtain, based at least in part on the first sensor information, a first location of the apparatus on a physical surface and a second location in a virtual space that comprises a location of the accessory, the first location corresponding to the second location via a mapping, and
cause transmission of the identifier of the accessory and information identifying the second location.

* * * * *